Dec. 24, 1940.  W. C. CASSON  2,225,980
HEAD LAMP ASSEMBLY
Filed Oct. 8, 1937  2 Sheets-Sheet 2
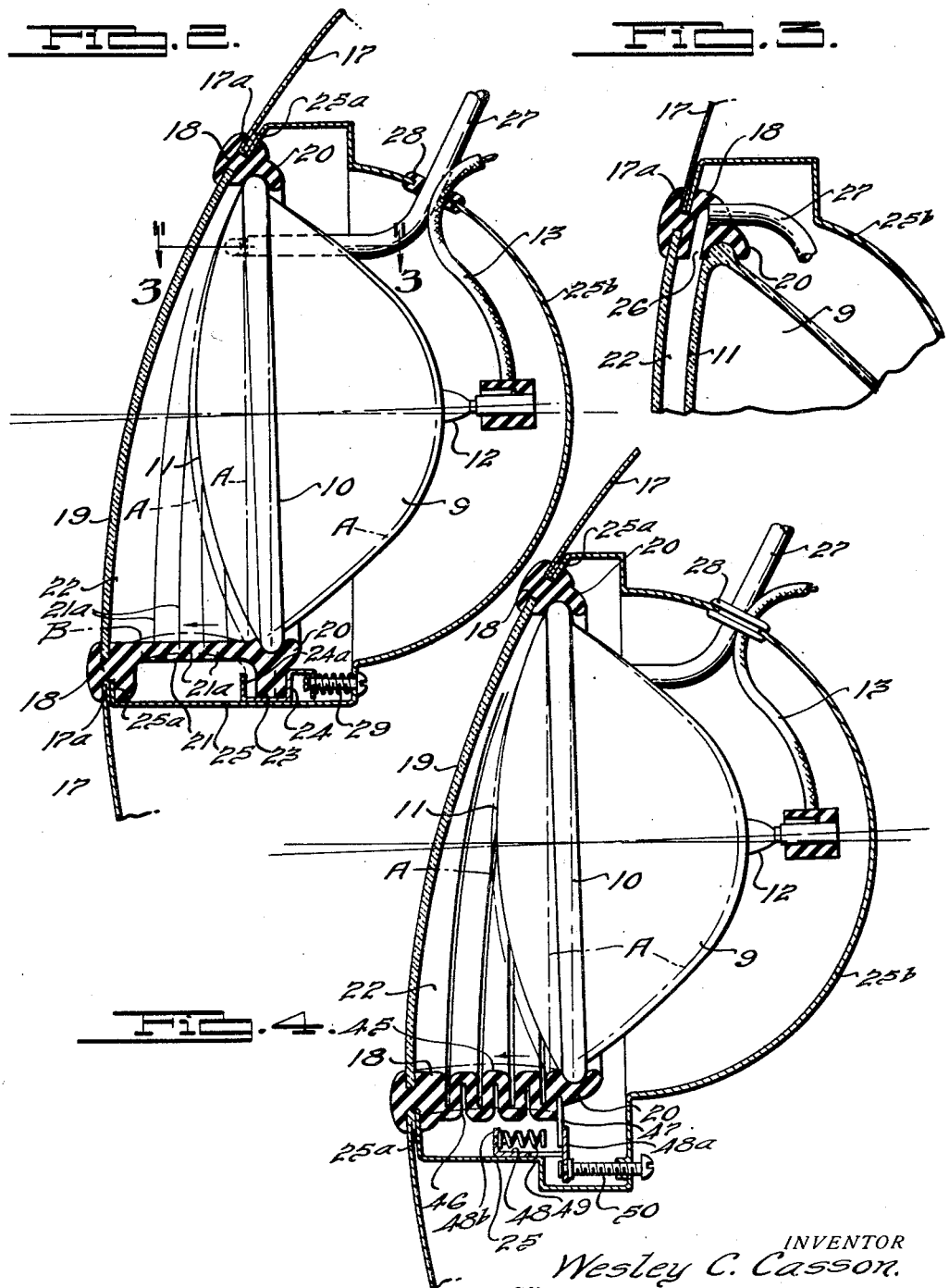
INVENTOR
Wesley C. Casson.
BY Dike, Calver & Gray
ATTORNEYS.

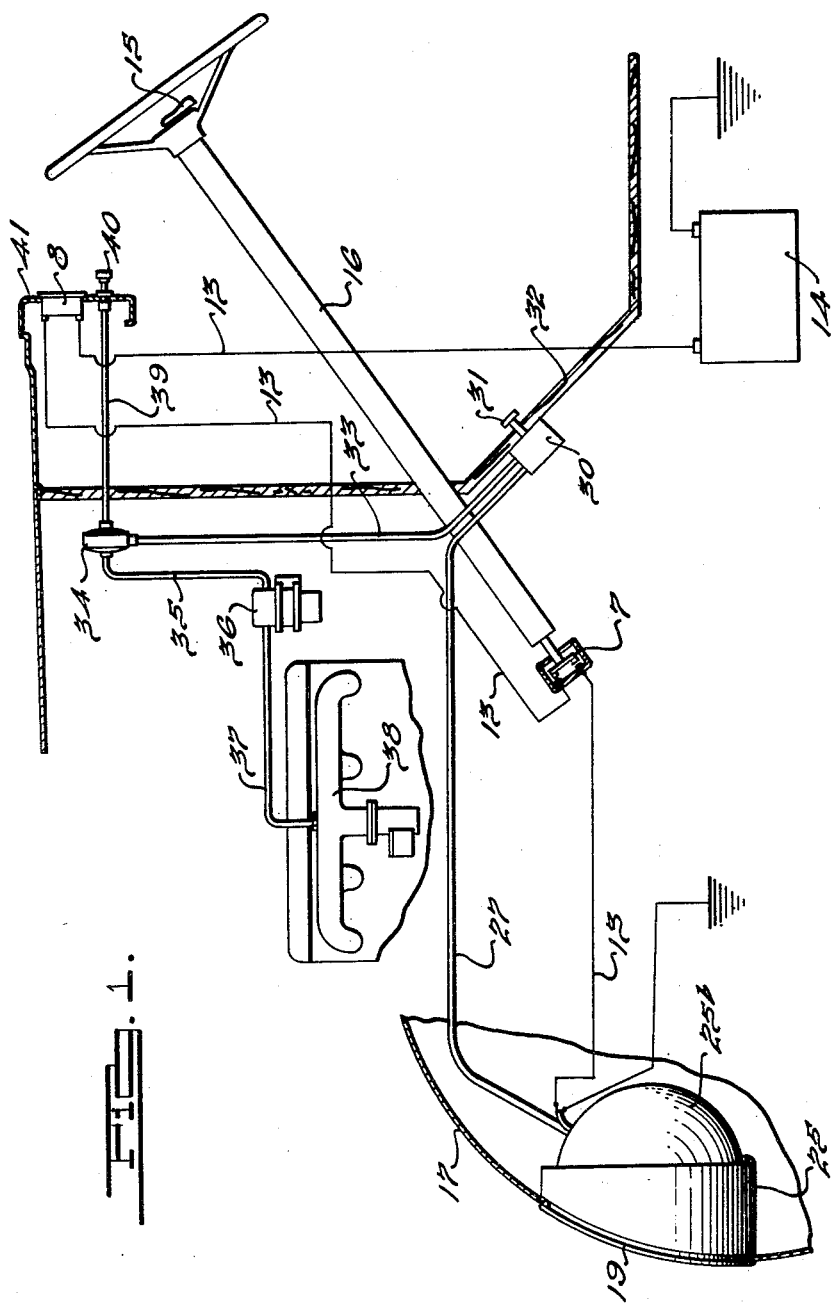

Patented Dec. 24, 1940

2,225,980

UNITED STATES PATENT OFFICE 2,225,980

HEAD-LAMP ASSEMBLY

Wesley C. Casson, Detroit, Mich., assignor to Briggs Manufacturing Company, Detroit, Mich., a corporation of Michigan Application October 8, 1937, Serial No. 168,022

6 Claims. (Cl. 240—61.10)

This invention relates generally to head-lamp assemblies and more particularly to improved means for mounting and adjusting head lamps of motor vehicles. The invention is especially, although not exclusively, useful in connection with single filament lamps of the type producing a single light beam and in which the lamp bulb, reflector and lens are formed in one unit. A lamp of this type having provision for only one filament and, therefore, emitting a single fixed beam has a definite disadvantage when adapted for use as an automobile head lamp since it does not, as in the case of conventional double filament head lamps, provide so-called bright and dim lights essential to night driving. To overcome this deficiency in lamps of the above type it has been suggested that the automobile be equipped with two pairs of head lamps, one pair furnishing the bright driving lights and the other pair the dimmer lights. Such procedure would obviously have many disadvantages, not only in respect to the increased expense of the car lighting equipment but also in respect to difficulties in locating the additional lamps on the vehicle.

An object of the present invention is to overcome the foregoing difficulties and provide improved means for mounting and controlling head lamps of the above mentioned single filament type whereby high and low adjustments of the beam of the lamp can be readily accomplished by the driver of the car, thereby permitting the use of one pair of such head lamps on an automobile.

A further object of the invention in general is to provide an improved mounting for a lamp, such as an automobile head lamp, and vacuum or suction actuated means for adjusting the lamp and hence varying the angularity of the light beam.

Another object of the invention is to provide vacuum actuated means for tilting a lamp, such as a head lamp, and also for adjusting the lamp into various normally fixed positions, as also to provide relatively simple and efficient means for controlling both the tilting means and the adjusting means for the lamp.

Other objects of this invention will appear in the following description and appended claims, reference being had to the accompanying drawings forming a part of this specification wherein like reference characters designate corresponding parts in the several views.

In said drawings:

Fig. 1 is a diagrammatic view illustrating a typical installation embodying the invention.

Fig. 2 is a vertical section through the forward end of a front fender illustrating an adjustable head lamp mounted thereon in accordance with the invention.

Fig. 3 is a fragmentary horizontal section taken substantially through lines 3—3 of Fig. 2 looking in the direction of the arrows.

Fig. 4 is a view similar to Fig. 2 but illustrating a slight modification of the embodiment shown in Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The head lamp proper is in the form of a unitary bulb formed of a transparent material such, for instance, as glass. The lamp bulb comprises a reflector portion or casing 9, the concave surface whereof is made light reflecting in any suitable manner, such, for example, as with the aid of a silver plating process used in mirror manufacture. The outer edges of the reflector portion 9 merges into a rim 10 which, in turn, merges into the outer edges of a convex lens portion 11 (see Fig. 3). The filament carrier or plug 12 has a single filament projecting centrally through the back of the casing 9 into the interior thereof. The inner surface of the casing forms the reflector of the head lamp unit thus described. Therefore, it will be seen that the parts 9, 10, 11 and 12, and the filament, provide, in effect, the lamp bulb for the head lamp unit. Current is supplied to the lamp filament by a conductor 13 from a battery 14 through an ammeter 8 and is controlled by a suitable switch 7 which may be located at any convenient point, such as at the lower end of the steering column 16 and which has a control member 15 located at the upper end of said steering column, as seen in Fig. 1. The head lamp unit is shown mounted at and beneath the forward downwardly curved end of the front fender of the automobile body, although it will be understood that the lamp unit may be located elsewhere upon the vehicle. The front downwardly curved end of the fender is shown at 17 and is provided with a hole or aperture to which is securely fastened, as by vulcanizing or bonding, a resilient or flexible rubber ring 18. The rubber ring has an outer groove into which the flanged edge 17a of the fender hole or aperture fits. The opening within the rubber ring 18 is closed and sealed by means of a transparent slightly convex disk 19 made of clear glass or other suitable material. The rubber sealing ring 18 is provided with an annular grooved bead or the like 20 within which fits and is bonded the rim 10 of the head-lamp unit, the latter extending preferably in a substantially vertical plane when installed. It will be noted that the connection between the bead or ring 20 and the ring 18 is in the form of an annular wall which flares downwardly from the top of the mounting and increases in area so that between the top and the bottom of the mounting the ring portions 18 and 20 are joined by a flexible rubber wall or diaphragm 21, see Fig. 2. This wall may be slitted, as shown at 21a in Fig. 2, or otherwise formed so as to be quite resilient and capable of flexing or expansible and contractible movements upon the application of vacuum, as later described.

The rubber portion 18, 20 and 21 are sealed to the head-lamp rim 10 and the front closure plate or disk 19 so that these portions bound and form therebetween an air-sealed suction or vacuum chamber 22. The ring 18 at its bottom may have a projecting lug portion 23 loosely mounted within a metal channel or groove 24 which is in turn supported upon the base 25 of a hollow casing or wall enclosing the entire unit. This casing has at its front an annular inturned flange 25a embedded within the rubber sealing and mounting ring 18. The casing also has a convex back wall 25b thereby providing a dust-proof enclosure for the entire head-lamp unit and the mounting for the head lamp. As shown in Fig. 3, the rubber mounting ring 18, near the top thereof, is provided with a duct or passage 26 to which is fitted one end of a vacuum or suction conduit, such as a flexible tube or pipe 27. This tube 27 as well as the conductor 13 pass through a hole in the back wall 25b of the casing, which hole is sealed, as shown, by means of a rubber grommet 28.

The channel 24 which supports the lower end or lug portion 23 of the mounting ring 20 is adjustable through the medium of a spring surrounded adjusting screw 29 so as to adjust the initial setting of the head lamp. The vacuum or suction conduit 27 extends to a valve casing 30, Fig. 1, which may be mounted upon the toe-board 32 of the vehicle. The valve casing has a two-way valve, which, as shown, is controlled by a foot operated switch 31 by means of which the conduit 27 may be subjected to a source of suction or vacuum by connecting it to the conduit 33, or may be subjected to atmosphere.

As seen in Fig. 1, the valve casing 30 is connected through conduit 33 to a vacuum metering or regulating and controlling valve and casing shown as a whole at 34. The valve casing 34 in turn is connected to a vacuum pump or booster 36 by a conduit 35. The pump, as shown, receives its supply of vacuum from the intake manifold 38 through a pipe or connecting conduit 37. The metering pin or valve within the valve casing 34 is manually controlled from the dash or instrument panel 41, by means of a push and pull rod or control 39 having a handle or knob 40 located on the exposed face of the instrument panel within convenient reach of the driver.

Under normal driving conditions there is no vacuum within the chamber 22 and the lamp unit or bulb 9, 10, 11 remains in its normal downwardly tilted position, as shown in full lines in Fig. 2, with the light beam directed downwardly toward the road surface. When, however, it becomes desirable to throw a beam of light upon the road surface at a greater distance in advance of the vehicle, the operator depresses the foot switch 31 to open the valve in casing 30 and connect the vacuum chamber 22 with the source of vacuum within the manifold 38. The vacuum within said chamber will cause the rubber wall or diaphragm 21 to cup or contract and assume its convex position or condition as shown in broken lines at B in Fig. 2, while, at the same time, the lamp or bulb 9, 10, 11 is moved by the diaphragm under the vacuum influence from its normal or full line position to its vertical or broken line position A, as shown in Fig. 2. The amount or degree of tilting or movement of the lamp may be governed or controlled by the vehicle operator by his manipulation of the throttle or valve control means 39, 40 which regulates the amount of vacuum to which the chamber 22 is subjected. To return the lamp to its normal or full line position, the operator again depresses the valve control switch 31 which opens the vacuum line 27 to the atmosphere to break the vacuum and allow the diaphragm to return to its normal or extended position, as shown in full lines in Fig. 2. Thus, it will be seen that the position of the head lamp is under the control of the vehicle operator and that he may vary, at will, the throw or range of the light beam emitted by the lamp so as to meet any and all conditions of night driving.

In the embodiment illustrated in Fig. 4 the flexible wall 45 which forms a wall portion or diaphragm of the suction or vacuum chamber 22 and which joins the rubber mounting ring 20 with the sealing ring 18 is constructed somewhat similarly to a bellows, the sections thereof being normally spaced apart as shown at 46. Thus, when the chamber 22 in Fig. 4 is subjected to suction through the suction conduit 27, the wall 45 will contract or be compressed from its normal or full line position, as shown, substantially in the direction of the arrow so that the lamp will assume a position as shown in broken lines at A. In either instance the bottom of the head lamp will be moved forwardly as shown in dotted lines in Fig. 2, the top of the lamp remaining substantially fixed and, therefore, in a sense, forming the axis about which the head lamp will tilt. Preferably in its normal position, when the chamber 22 is subjected to atmospheric pressure through the conduit 27 and switch controlled valve 30, 31, the head lamp will be in a slightly angular position with respect to the vertical so as to direct its beam in a slightly downward direction at the proper angle to the horizontal so as to effect the equivalent of a dimmer light. When the chamber 22 is subjected to suction the head lamp will be tilted so as to raise the beam as indicated.

The manual adjustment of the form of lamp mounting shown in Fig. 4 operates generally similar to the manual adjustment 24, 29 of the preceding form and comprises a substantially vertical metal plate 47 secured to the bead portion 20 of the bellows 45. A channel member 48 is slidingly mounted upon the bottom wall of the casing 25 and has front and rear upright walls or flanges. The rear wall 48a is adapted normally to be engaged by the rear face of the plate 47 and provide a stop limiting rearward movement thereof. A coil spring 49 is secured to the front wall or flange 48b and is interposed between the flanges 48b and 48a and spaced from the plate 47. An adjusting screw 50 is threaded through a tapped opening in a screw boss on the housing wall 25b and is rotatably mounted in a depending lug or tongue struck or lanced out of the metal of the bottom web of channel 48. Thus, by adjusting the screw forwards to move the channel 48 in a like direction the flange 48a will move the plate 47 forwardly and compress the bellows to thereby tilt the lamp unit 9. Upon backing up the adjusting screw 50 to move the channel 48 rearwardly the plate 47 will follow the abutment flange 48a by reason of the expansion effort of the bellows 45. Thus, a predetermined initial setting of the lamp may be had by reason of the adjusting screw 50 and associated parts. When vacuum is applied to the chamber 22 and the bellows is thereby compressed or contracted, the plate 47 will move forwardly with the bellows away from wall 48a and contact or engage the stop spring 49.

In practice it is desirable not only to tilt the lamp in a vertical direction but also in a lateral or horizontal direction so that during night driving the light beam may also be shifted toward the side of the road as well as focusing the light at a point nearer the front of the car. Obviously, if desired, the vacuum chamber and lamp mounting may be arranged to swing the lamp horizontally instead of vertically without appreciably lowering or elevating the beam.

However, in the present embodiments it is preferred to adjust the lamp pneumatically so that the beam will be adjusted both horizontally and vertically at the same time. In the embodiment of Fig. 2 this is accomplished by providing two laterally spaced separate stop units 23—24 at the bottom of the lamp, one stop unit having its channel 24 adjusted further forward than the other in the dimmer position of the lamp, hence directing the beam downward and to the side of the road. When vacuum is applied to the chamber 22 one lug 23 will have a greater forward movement than the other lug and hence as the light beam is raised it will at the same time be swung laterally from the side of the road to a more or less straight ahead direction.

In the embodiment of Fig. 4 preferably the same compound adjustment, i. e. vertically and horizontally, is accomplished by providing separate duplicate laterally spaced adjusting and stop devices 47—50 at the bottom of the lamp unit. In this instance in the dimmer position of the lamp one abutment flange 48a will be adjusted to a further forward position than the other, bringing the plate 47 thereof closer to its stop spring 49. As a consequence, in the dimmer position the head lamp will be tilted down and sidewise. When, therefore, vacuum is applied to the chamber 22 one of the separated laterally spaced members 47 carried at the bottom of the bellows 45 will move forward, compressing its spring 49, a greater distance than the other, thereby raising the light beam and moving it horizontally to a straight ahead position. It will be understood that substantially solid stops may be substituted for the spring stops 49, or resilient rubber or other types of cushion stops may be employed.

It will be understood that in its broader aspects the pneumatic chamber 22 may be subjected to variable pressures for adjusting the angularity of the lamp otherwise than by utilizing the suction or vacuum of the engine.

I claim:
1. The combination of a lamp unit adapted for use with a transparent member carried by a vehicle comprising an angularly movable reflector element, flexible sealing means interposed between the transparent member and reflector element and cooperating therewith to form a pneumatic chamber, means for subjecting said chamber to variable pressures to flex the sealing means to move the reflector element, and means for varying the range of angular movement of the reflector element.

2. In a headlight assembly, the combination of a lamp bulb having integrally formed portions constituting a reflector and a lens, respectively, a flexible member adapted to be mounted in a vehicle and having two end openings, said member forming a portion of a chamber and said bulb being mounted in one of said openings to form a movable back end wall of said chamber with said lens being arranged toward the front of the vehicle, a transparent stationary wall mounted in the other end opening of said member to form the front end stationary wall of the chamber, and means adapted to create partial vacuum in said chamber and to cause atmospheric pressure to act on said bulb and to move the same, flexing said member, to change the angularity of the reflected light beam.

3. In a headlight assembly, a lamp bulb comprising a lens and a reflector portion integrally formed and a filament operatively arranged within the bulb, a resilient enclosure adapted to receive said bulb for mounting therein, said bulb when mounted therein forming one end wall of said enclosure, said enclosure having an opening in front of said bulb, a transparent element closing said opening and forming the other end wall of said enclosure, and means adapted to create difference in pressure within said enclosure as compared with the atmospheric pressure to flex said resilient enclosure, thereby moving said bulb and changing the angularity of the reflected light beam.

4. In a headlight assembly, a unitary lamp bulb comprising integrally formed lens and reflector portions with a filament operatively arranged within the bulb, a resilient chamber having an opening adapted to receive said bulb, said chamber being adapted to be connected to a support and provided with a transparently covered window in front of said bulb, and pneumatic means adapted to flex said chamber and to move said bulb within predetermined limits to cause change of angularity of the reflected light beam.

5. In a headlight assembly, a unitary lamp bulb comprising integrally formed lens and reflector portions with a filament operatively arranged within the bulb, a resilient chamber having an opening adapted to receive said bulb, said chamber being adapted to be connected to a support and provided with a transparently covered window in front of said bulb, means adapted to create partial vacuum in said chamber in order to cause atmospheric pressure to flex said chamber and to move said bulb to cause changes in angularity of the reflected light beam, and stop means determining the length of the operative movement of said bulb.

6. In a headlight assembly, a unitary lamp bulb comprising integrally formed lens and reflector portions with a filament operatively arranged within the bulb, a resilient chamber having an opening adapted to receive said bulb, said chamber being adapted to be connected to a support, a transparently covered window in front of said bulb, means adapted to create partial vacuum in said chamber in order to cause atmospheric pressure to flex said chamber and to move said bulb to cause changes of angularity of the reflected light beam, said chamber possessing sufficient resiliency to resume its unflexed shape when vacuum in the chamber is removed, and adjustable stop means determining the extremities of the operative movement of said bulb.

WESLEY C. CASSON.